(No Model.)
W. C. LOCKWOOD.
ELECTRIC CALL FOR TELEPHONES AND OTHER PURPOSES.
No. 252,322. Patented Jan. 17, 1882.
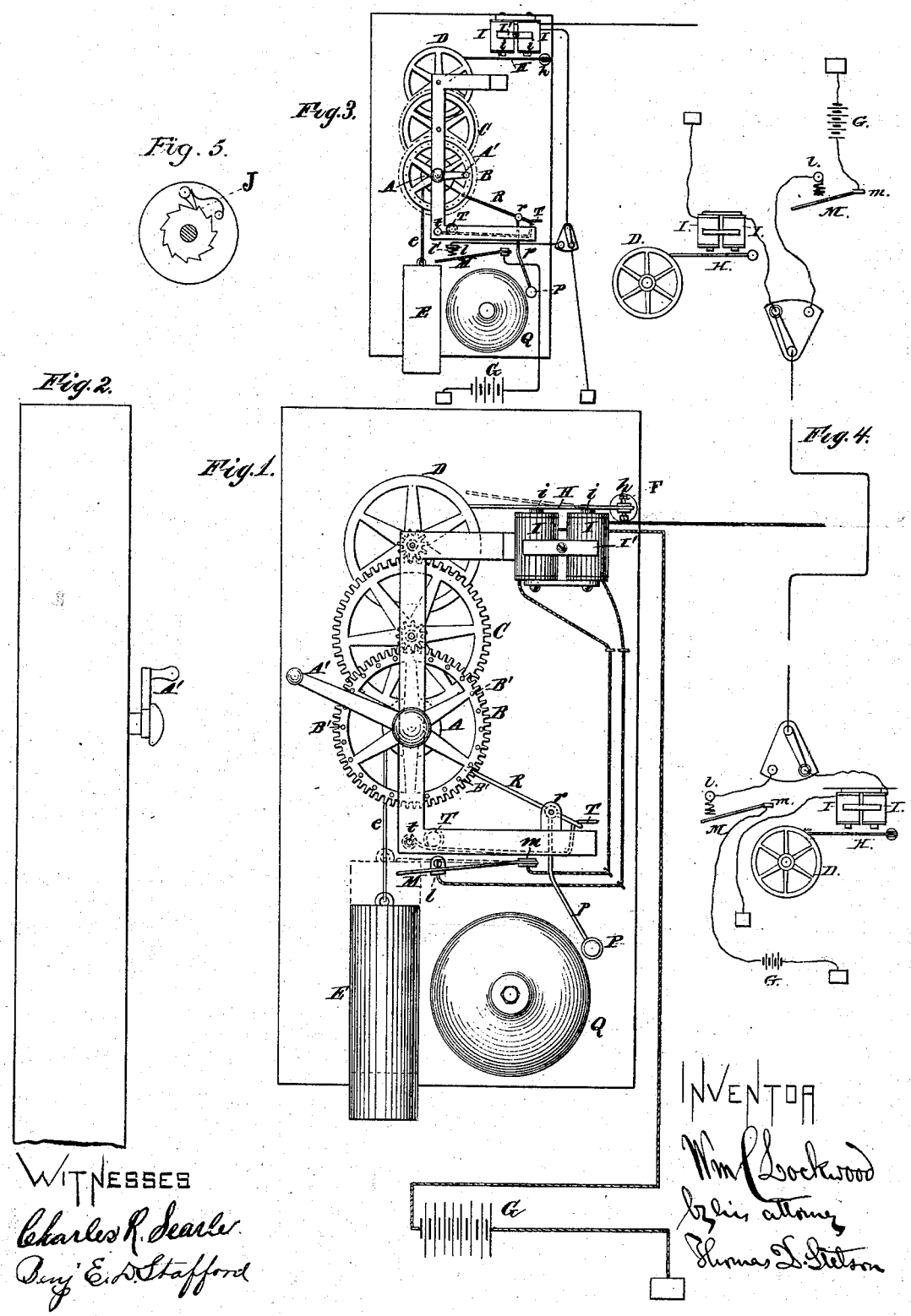
WITNESSES
Charles R. Searle
Benj' E. D. Stafford
INVENTOR
Wm C Lockwood
by his attorney
Thomas D. Stetson

UNITED STATES PATENT OFFICE.

WILLIAM C. LOCKWOOD, OF BROOKLYN, NEW YORK, ASSIGNOR, BY MESNE ASSIGNMENT, TO THE LONG DISTANCE ELECTRIC CALL COMPANY, OF SAME PLACE.

ELECTRIC CALL FOR TELEPHONES AND OTHER PURPOSES.

SPECIFICATION forming part of Letters Patent No. 252,322, dated January 17, 1882.

Application filed March 10, 1881. (No model.)

*To all whom it may concern:*

Be it known that I, WILLIAM C. LOCKWOOD, a citizen of the United States, residing in Brooklyn, in the county of Kings and State of New York, have invented certain new and useful Improvements in Electric Calls for Telephones and Analogous Purposes, of which the following is a specification.

I employ the power of a weight or spring to ring the gong or to work such other mechanism as may be required to loudly and distinctly attract attention. The weight, spring, or analogous mechanical power is kept stored, ready for use so soon as the proper electrical condition is induced, which latter may be effected from either end of the line. The mechanism for operating the call insures that the weight shall be kept constantly wound up. The call is induced by what may be termed "overwinding" the weight or spring. The same signal is produced at both ends of the line by the overwinding at either end.

The accompanying drawings form a part of this specification, and represent what I consider the best means of carrying out the invention.

Figure 1 is a front elevation of the apparatus at one end of the line with the inclosing-case removed. It will be understood that the apparatus at the other end of the line may be exactly similar. Fig. 2 is a side elevation with the inclosing-case applied, which prevents access to the apparatus except through the winding up of the weight by means of the crank, which extends outside of the case at a convenient position at the front. The additional figures represent a modification, and will be described farther on.

Similar letters of reference indicate corresponding parts in all the figures.

Referring to Fig. 1, a fixed frame-work supports the bearings of a train of gear-wheels, B C D. The wheel B receives on a windlass, A, the cord e, which supports a sufficiently heavy weight, E. The windlass A is connected to the train of wheel work by a ratchet, J, (see Fig. 5,) and is wound by the application of a suitable key. Turning the windlass A in one direction winds up the weight E. Liberating it allows the weight to exert the mechanical force due to its gravity to turn the train of wheels. It turns the wheel B slowly, the wheel C faster, and the wheel D faster still.

P is a hammer, mounted on a wire, p, connected to a rocking shaft, r, to which is fixed a lever, R. The long arm of this lever is in position to be actuated by the pins B' on the wheel B. The short arm of this lever is subject to the force of the spring T, secured to a fixed point, t. When the train of wheels B C D is turned the force of the spring T is sufficient to induce a vigorous blow of the hammer P against the gong Q after each passage of a pin, B'.

H is a spring, connected to an adjustable center, h. The spring H stands by its elastic force a little distance from the periphery of the quick-running wheel D.

I I are helical coils of insulated wire, encircling cores i i, and held by a support, I', in a position close to the spring H. The spring H is either entirely or partly of soft iron. The adjustable center h is moved up and down by set-screws F, so that it shall tend to stand a very little distance away from the electro magnets I i. When a circuit is formed through the coils I the spring H is drawn forcibly down, and exerts a pressure on the wheel D, which produces sufficient friction to arrest its motion and hold the train of wheel-work, with the suspended weight E, motionless.

M is a spring, of steel or other conducting material, fastened to a fixed point, m, and tending by its elastic force to press gently down upon a stop, l. The post m is connected to the positive wire from the helix I. The post l is connected to the earth, (not shown,) while the negative wire from the helix I i is connected to and constitutes the main wire, leading over proper insulated connections, as usual, to the other end of the line, where a corresponding apparatus is employed.

The battery G maintains a gentle but constant current through the helices, and consequently maintains the magnetism of the cores i, and holds the spring H forcibly upon the quick-running wheel D. It produces this effect equally at both ends of the line, and consequently holds the train of wheels B C D stationary at both ends of the line so long as the current is flowing.

There are two points where the circuit is liable to be broken. One is at the spring M at this end of the line and the other is at a corresponding spring at the other end of the line. Both ends of the line are provided with a similar set of apparatus, except that there need not under all circumstances be a battery, G, at both ends of the line. If two batteries are employed the same current flows through each, and neither can work except the circuit is complete. Both will in such case impart their force to the current; but if a sufficiently strong battery is employed at one end of the line it is sufficient under ordinary conditions.

The spring M at each end of the line extends over or beyond the stop $l$, as indicated. The arrangement of the parts is such that a sufficient winding up of the apparatus will elevate the weight E and bring it in contact with the free end of the spring M. Then a continuance of the winding motion will lift the spring M out of contact with the stop $l$. This will break the circuit.

It will be understood that, a similar apparatus being employed at both ends of the line, the winding up of the weight E at either end sufficiently to lift the spring M at that end will break the circuit. The moment the circuit is broken the electro-magnets I $i$ at both ends of the line lose their power, and the spring H at each end of the line immediately lifts itself clear of its corresponding quick wheel, D, and allows its train of wheels to turn and its weight E to descend. This will induce a slow rotation of the wheel B and a series of strokes of the hammer P upon the gong Q at both ends of the line. All that is necessary to send a call over the line and to cause the respective gongs Q to speak at both ends of the lines is to wind up either weight E to a sufficient height to lift its respective spring M. So soon as the apparatus which has been thus overwound at one end of the line has run down sufficiently to allow its spring M to again rest on the stop $l$ the circuit is again closed, and the apparatus at both ends is brought to rest by the reinvigoration of the electro-magnets I $i$ at both ends.

I inclose the mechanism in a suitable case, and provide no other means for obtaining access to the apparatus to break the circuit than by turning the windlass A and overwinding the weight E. It is thus necessary, in order to send a call, that the weight E shall be fully wound up. The sending of an occasional call from each end insures that the apparatus is always fully wound up, ready to act on the receipt of a call from the other end of the line.

It will be seen that the alarm is given by power contained in itself. A simple turn of the winding-crank or corresponding key or button breaks the current and sounds the alarm until the spring is brought back to close circuit. It only requires a very little current to magnetize the soft-iron cores sufficiently to hold the spring to the quick wheel and make sufficient friction to hold the alarm silent.

It will be observed that only a portion of the whole number of coils around the cores of the electro-magnet are made by the wire before it traverses to the vicinity of the spring M, and that another portion of the convolutions around one or both the soft cores is made afterward. The wires extend up again to the electro-magnet after having passed the brake, in order to complete the proper number of convolutions, and extend thence to the battery or to the earth, as the case may be.

I attach importance to the directness of the action of electo-magnets I $i$ on the quick wheel D through the medium simply of the spring-armature H, with its delicately-adjustable support between the pinching-screws F.

Modifications may be made in many of the details. I can use a greater or less number of wheels in the train B C D. I can use springs and, perhaps, various other mechanical means as a substitute for the weight E. With any form of mechanical motor which requires to be wound up my invention insures that it shall be kept wound and in condition for prompt action.

I have in my experiments used the apparatus with a closed-circuit battery in the form shown, maintaining a constant circuit when the apparatus is out of use, and causing it to act by an interruption of the circuit; but a very obvious reversal of the arrangement may be made, in which the elasticity of the springs H will induce pressure on the quick wheel D, and the force of the electro-magnets, when induced for the purpose of making a call, will lift the spring H at each end of the line and allow the signal to be made. With such arrangement the current does not flow except during the brief period while one weight is wound quite up. It requires two batteries (see Fig. 4) with ordinary switch-connections for allowing either one without the other to make a complete circuit over the main line and through the electro-magnet at both ends thereof.

Fig. 3 shows the reversed arrangement of the electro-magnets I $i$ relatively to the spring H, which may be employed to carry out this invention, and also the corresponding reversed arrangement of the stop $l$ relatively to the spring M. Fig. 4 is a plan view of the ordinary switch-connection.

It will be understood that before or simultaneously with the turning of the crank A' the switch-lever, which should be conveniently adjacent, must be turned to break the connection which ordinarily obtains between this end of the line and the earth, and to make a connection between this end of the line and the battery; but it will be understood that the connection from the battery to the main line is still incomplete after the switch-lever is turned until the weight is overwound. The overwinding of the weight at this end of the line makes the connection complete over the main line and through the connection to the ground, which still obtains at the other end, and thus through the electro-magnets at both ends of the line. Thus conditioned the force of the electro magnets takes off the brakes and allows the weights at both ends to run down and induce the proper striking of the gong at each end. So soon as the weight at this end has run down sufficiently to disconnect the lever M from the stop the alarm will stop. Care must be taken with this mode of working to turn the switch before and after each operation. I can make this automatic by the opening and closing of a door which covers the winding-crank, or by the ordinary provision for changing a switch by the lifting off and hooking on of the receiving instrument. (Not represented.) I prefer with this open-battery arrangement to employ a spring, $l'$, attached to the stop $l$, so as to maintain the connection between the stop $l$ and the spring M for a considerable period, and thus insure several repetitions of the strokes of the hammer. This modification, which may be adopted with proper conditions in other respects, will make the winding of the weight quite up change the lever or contact piece so as to make the connection instead of breaking it. In such case the running down of the weight again will break the connection instead of making it. I esteem such an arrangement an equivalent of the one described.

I claim as my invention—

1. In an electric call, the combination, with an electro-magnet and suitable electrical connections, the spring or controlling lever M and stop $l$, arranged, as shown, relatively to the weight or motor E, operated by winding means A, so that the winding of the apparatus, by changing the circuit from one condition to another, makes the call, and the running down of the apparatus, by changing the circuit again to its previous condition, discontinues the call, as herein specified.

2. The combination of an electro-magnet, an armature also serving as a brake, a train of mechanism controlled by said brake, a weight or equivalent motor changing its position as the machine runs down, and a spring or contact piece, M, stop $l$, and suitable electrical connections arranged to be separated by the adjustment of the machine for work and to come in contact and close the circuit by the working of the machine, as herein specified.

In witness whereof I have hereunto set my hand, at New York city, this 28th day of February, 1881, in the presence of two subscribing witnesses.

W. C. LOCKWOOD.

Witnesses:
 CHARLES C. STETSON,
 M. F. BOYLE.